Figure 1:
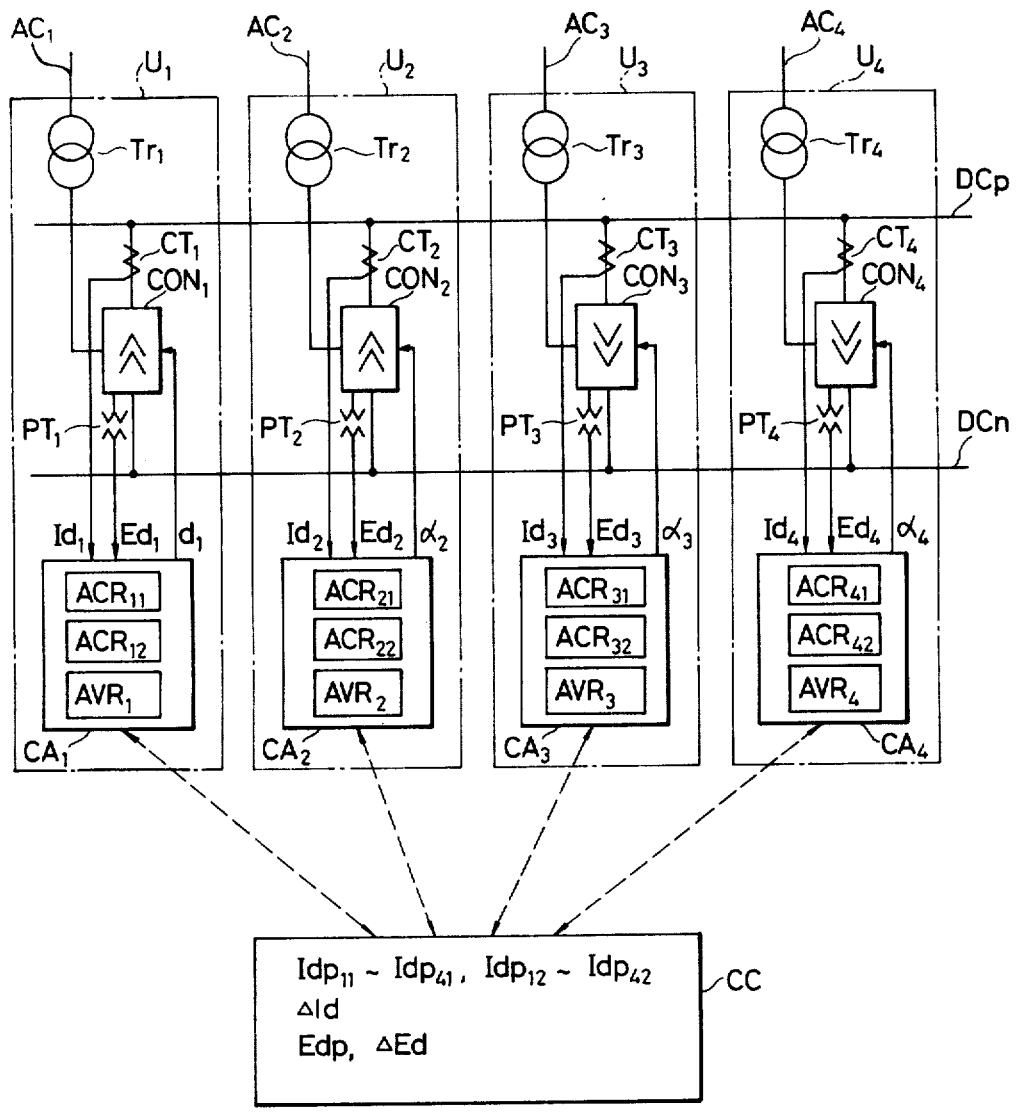

United States Patent [19]

Sakurai et al.

[11] 4,441,032
[45] Apr. 3, 1984

[54] CONVERTER CONTROL APPARATUS FOR PARALLEL CONNECTED MULTI-TERMINAL DIRECT CURRENT SYSTEM

[75] Inventors: Takeichi Sakurai, Tokyo; Kiyoshi Goto, Musashino; Hiroo Konishi, Katsuta; Tadao Kawai, Hitachi, all of Japan

[73] Assignee: Hitachi, Ltd., Tokyo, Japan

[21] Appl. No.: 341,575

[22] Filed: Jan. 21, 1982

[30] Foreign Application Priority Data

Jan. 21, 1981 [JP] Japan .................................. 56-6330

[51] Int. Cl.³ .............................................. H02J 1/00
[52] U.S. Cl. ...................................... 307/82; 363/69; 363/71
[58] Field of Search .................. 307/44, 47, 52, 82; 363/65, 67, 69, 71

[56] References Cited

U.S. PATENT DOCUMENTS

| | | | |
|---|---|---|---|
| 3,943,429 | 3/1976 | Heintze | 363/71 |
| 4,270,165 | 5/1981 | Carpenter et al. | 363/65 |
| 4,328,429 | 5/1982 | Kublick | 307/82 X |

FOREIGN PATENT DOCUMENTS 1033808  6/1978  Canada .

OTHER PUBLICATIONS

Azzis and Baret, "Parallel Identical Direct-Mode DC-DC Converters", IBM Tech. Disclosure Bulletin, vol. 25, No. 2, Jul. 1982.

*Primary Examiner*—E. A. Goldberg
*Assistant Examiner*—Derek Jennings
*Attorney, Agent, or Firm*—Antonelli, Terry & Wands

[57] ABSTRACT

Two rectifiers and two inverters are operated under the state under which they are connected in parallel by common transmission lines. These rectifiers and inverters are controlled an independent control apparatus respectively which can selectively apply either the constant current control or the constant voltage control.

The control apparatus of each converter has bestowed thereon the reference value of a current to flow through the particular converter and the reference value of a terminal voltage of the particular converter. A signal for lowering the current reference value is added to the control apparatus of one or all of the converters which are to be operated as the inverters. On the other hand, a signal for essentially rendering the terminal voltage of the converter smaller than the voltage reference value is added to the control apparatus of the converter which is to be operated as the converter for determining the voltage of a direct current system.

12 Claims, 16 Drawing Figures

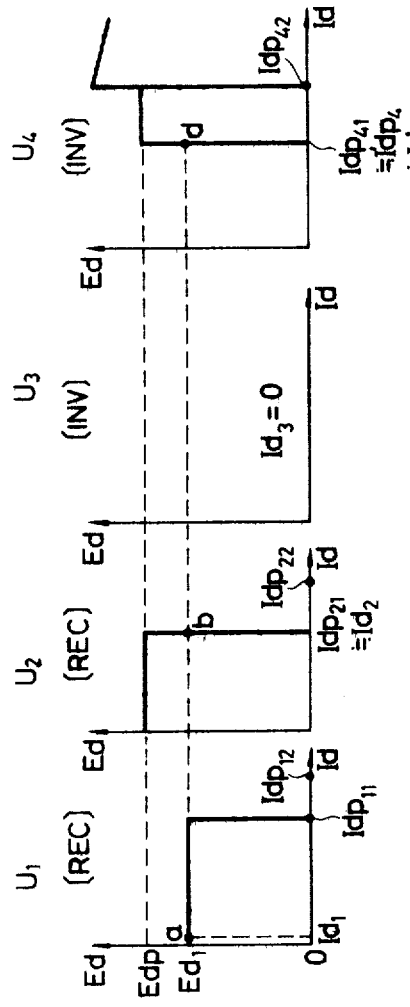
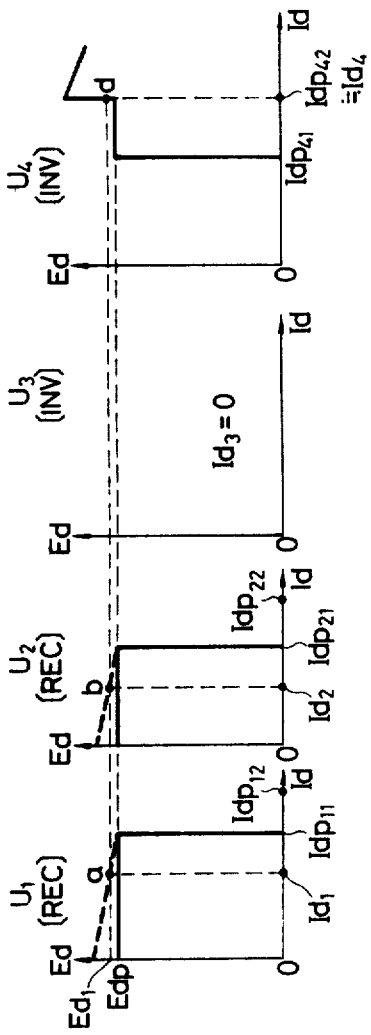
FIG. 8
FIG. 9

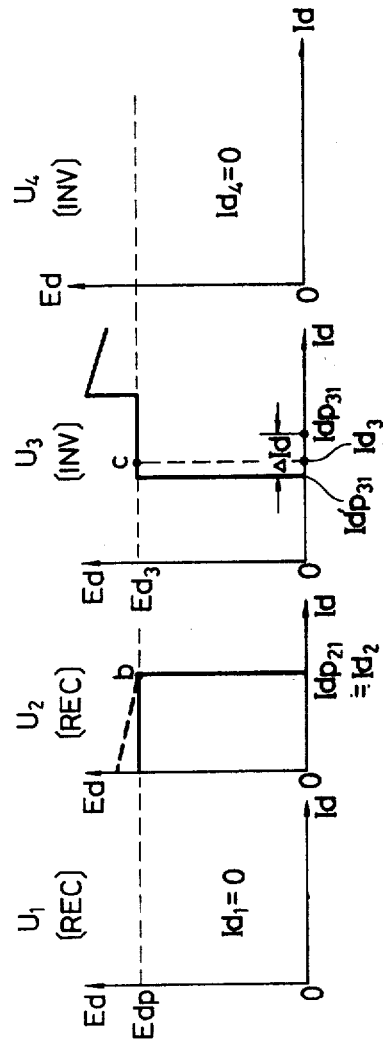
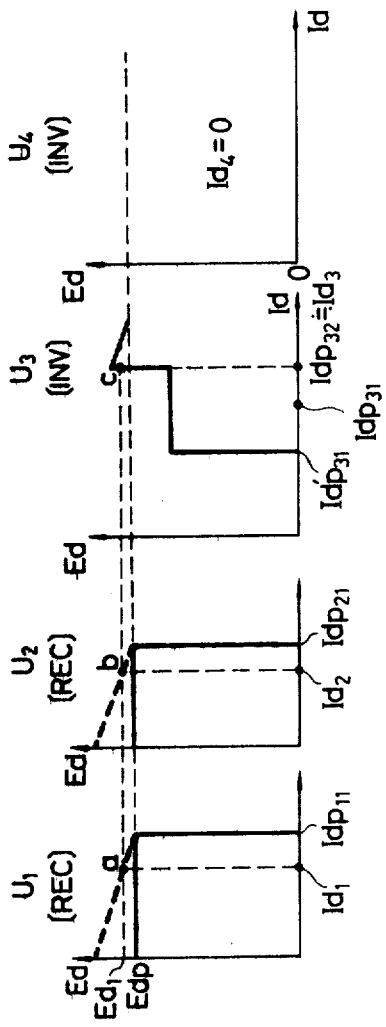

CONVERTER CONTROL APPARATUS FOR PARALLEL CONNECTED MULTI-TERMINAL DIRECT CURRENT SYSTEM

Converter control apparatus for a parallel connected multi terminal direct current system.

This invention relates to a converter control apparatus for use in the case where three or more converters are connected in parallel by common direct current transmission lines and thus form a multi-terminal direct current system.

As is well known, the control apparatus of a converter for direct current power transmission is usually constructed so that it bestows a control pulse on the converter in correspondence with the difference between a current reference value for the constant current control and the actual transmission line current. A signal for reducing the reference value by a certain value called the current margin is bestowed on the control apparatus of the converter which is to be operated as an inverter. As a result, the current of the direct current transmission line is determined by a rectifier, while the voltage is determined by the inverter. Thus, a stable running operation is obtained.

When two converters are coupled at 1-to-1 by a single transmission line, the control apparatus of the above construction is satisfactory. In contrast, when three or more converters, for example, two rectifiers and two inverters, are connected in parallel by common transmission lines, contrivances are needed in the allotment of currents among the converters and the determination of the voltage of the direct current system.

Various expedients have therefore been proposed.

For example, Canadian Pat. No. 1033808 (Sweden Pat. No. 7512302) has proposed a control system in which each of plural converters is controlled by a control apparatus which can selectively apply either constant current control or constant voltage control. In the control system, when one converter operates as a direct current transmission line voltage control converter, the remaining converters operate as a direct current transmission line current control converter.

The control system is very useful for the operation of a parallel connected multi-terminal direct current system. But the system is not fully satisfactory, for example, when one converter operating as a inverter is removed from the direct current system by chance for some reason. In this case, the D.C. current supplied by the converters operating as rectifiers flows into other converters operating as an inverter through a direct current transmission line. The converters as an inverter, therefore, are operated under an over current condition. Such a condition is most severe where the removed converter was operated as an inverter and as a direct current transmission line voltage control converter.

It is accordingly an object of this invention to provide a control apparatus which, when one of converters operating as an inverter is removed from a direct current system, prevents the remaining converters from being brought under the over current operation.

In order to accomplish the object of this invention, the control apparatus of this invention is contrived as follows:

(1) The apparatus comprises two constant current control units each of which bestows a control signal corresponding to the deviation between a predetermined current reference signal and a real current signal flowing through a converter, and a constant voltage control unit which bestows a control signal corresponding to the deviation between a predetermined voltage reference signal and a real voltage signal of a direct current system.

(2) The current reference signals to be fed to the first constant current control units of the respective converters are so set that the sum of the current reference signal values of rectifiers among the converters is greater by a certain value (called "the current margin") than the sum of the current reference signal values of inverters among the converters.

(3) Each of the current reference signals to be fed to the second constant current control units of the respective converters is so set that the current reference signal value is the allowable maximum current value of operation of the respective converters.

(4) In the constant voltage control system, a correcting signal is applied to the control apparatus of the converter for determining the voltage of the direct current system so that the voltage reference signal value may decrease by a certain value (termed "the voltage margin").

(5) Simultaneously, from among the respective control signals thus formed, the optimum one is selected by two maximum value selector circuits as well as a minimum value selector circuit and is delivered as an output.

Figure 2:
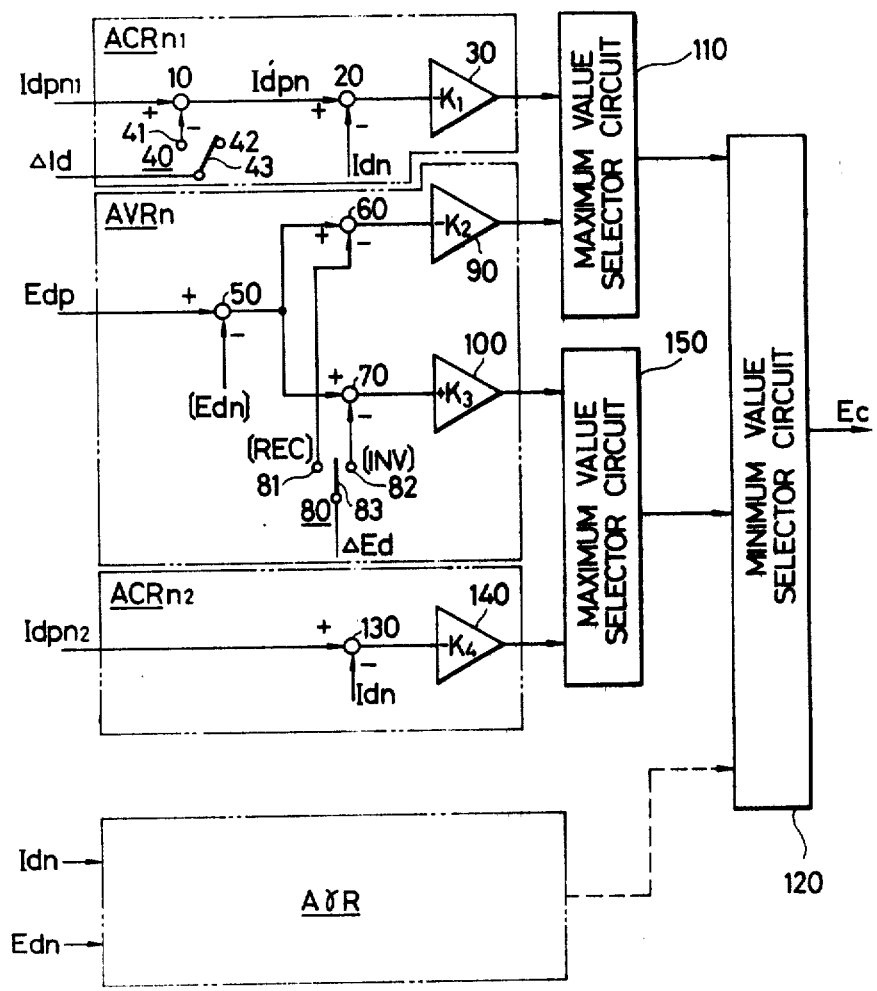
Figure 3:
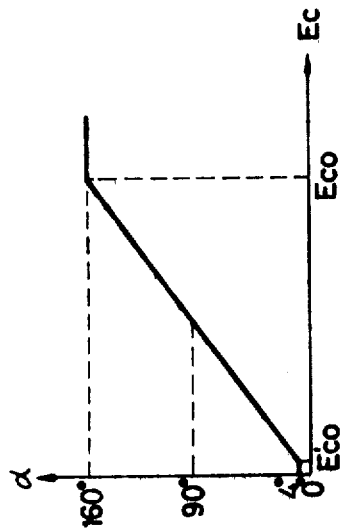
Figure 4:
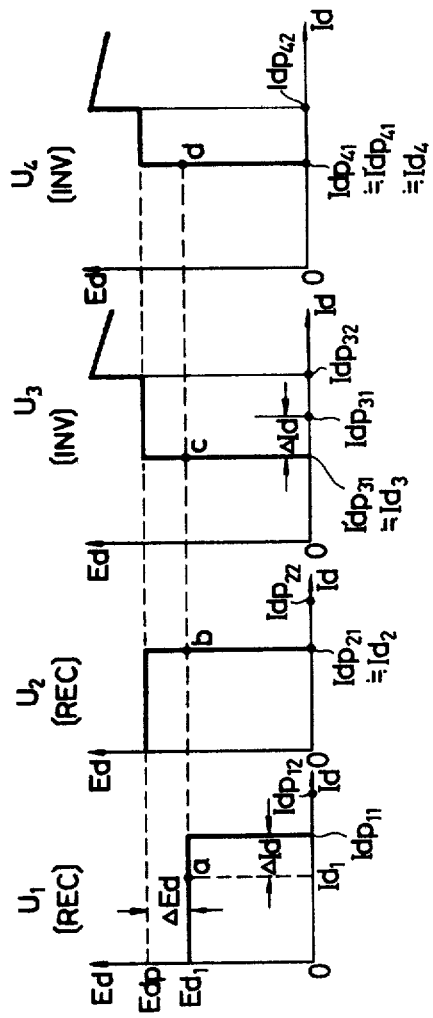
Figure 5:
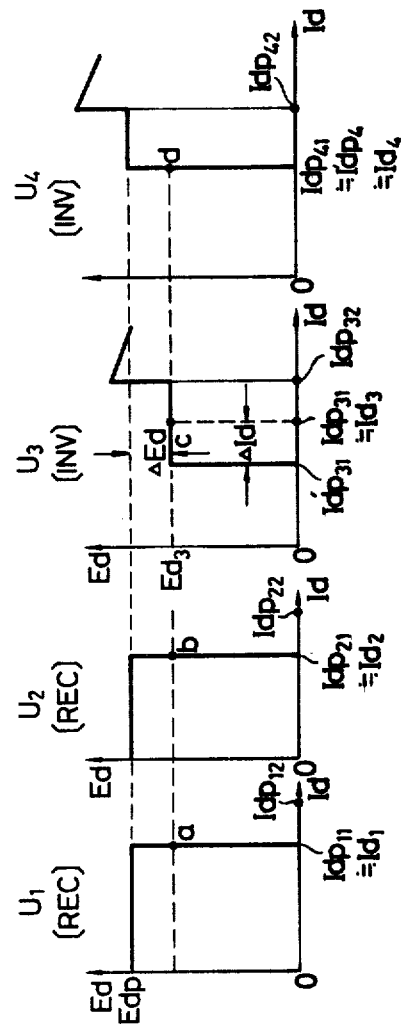
Figure 7:
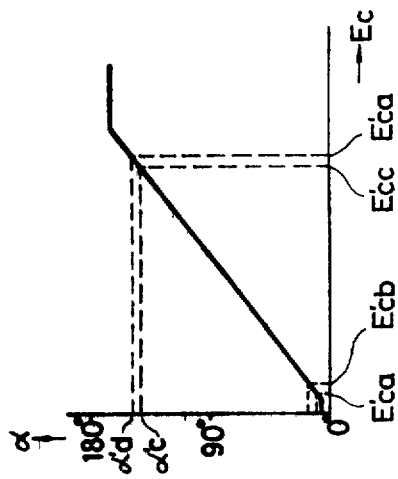
Figure 6:
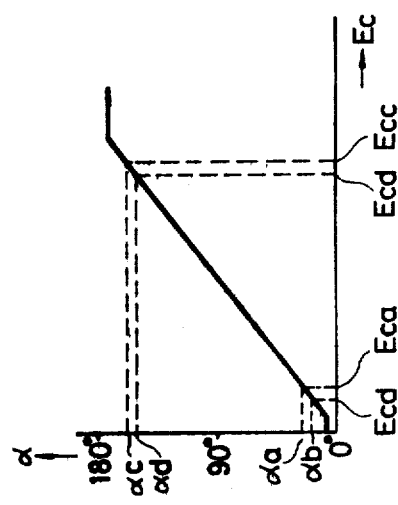
Figure 12:
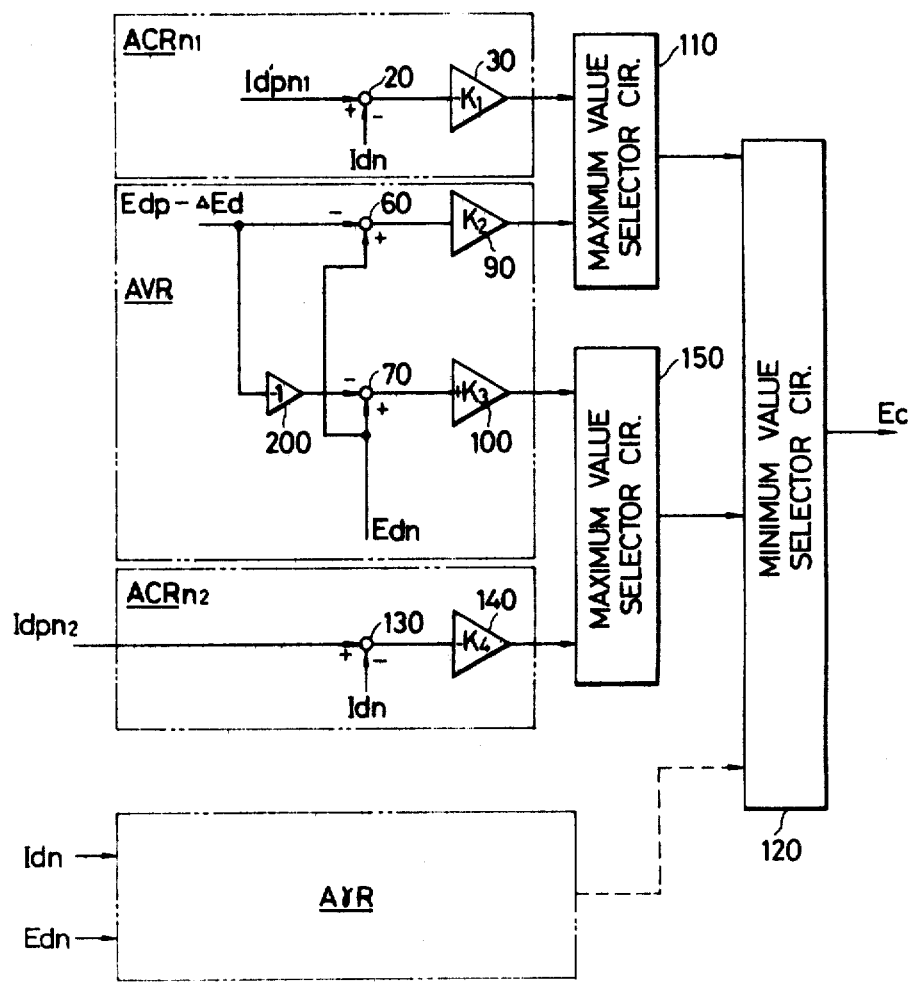
Figure 13:
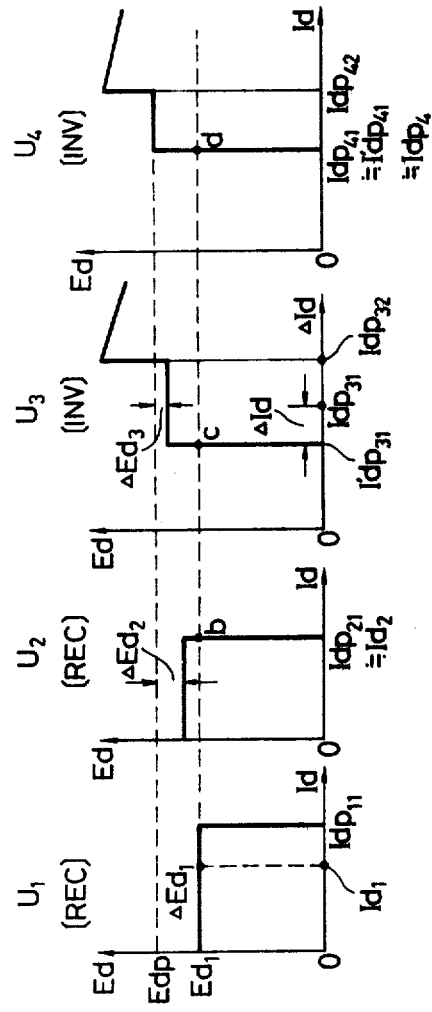
Figure 14:
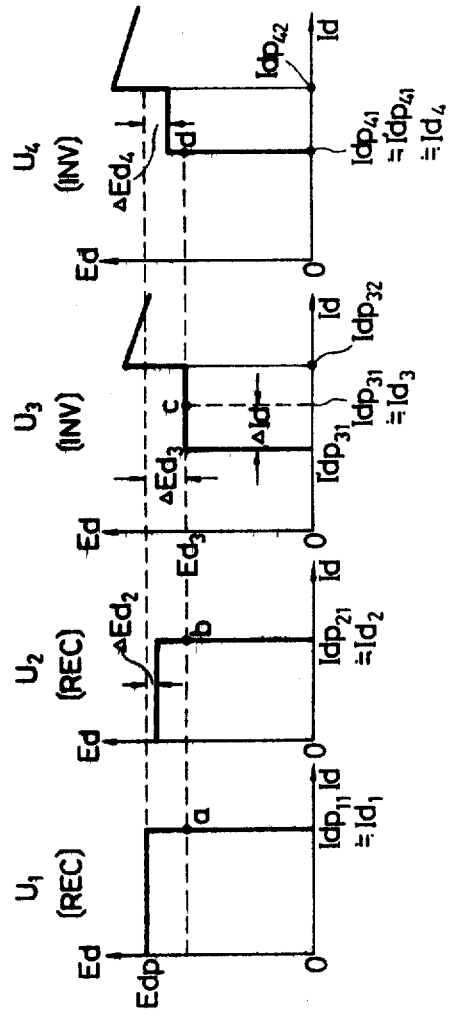
Figure 15:
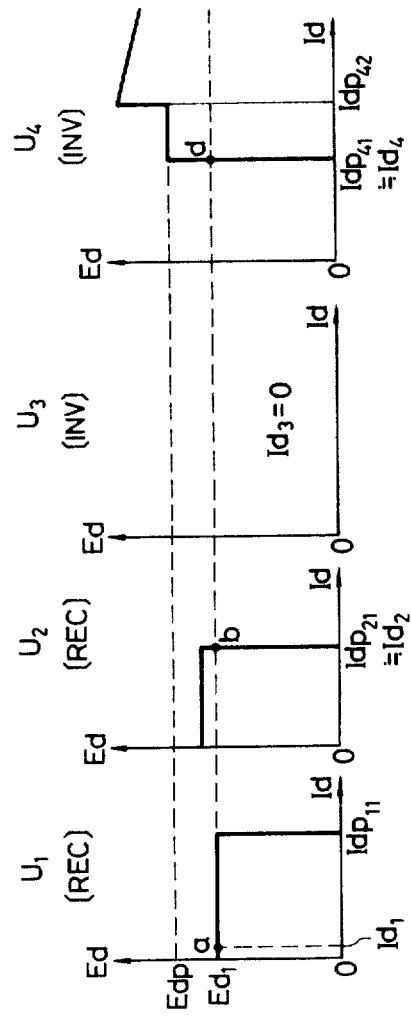
Figure 16:
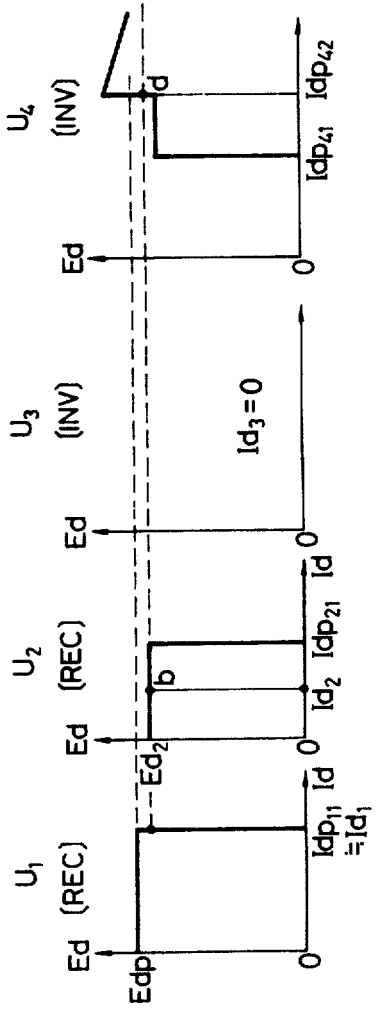

FIG. 1 is a block diagram conceptually showing the position which the control apparatus of this invention occupies in a direct current system, FIG. 2 is a block diagrams showing an embodiment of the essential portions of the control apparatus of this invention, FIG. 3 is a characteristic diagram showing an example of the characteristic of a phase shifter circuit as can be used in this invention, FIGS. 4 and 5 are characteristic diagrams for explaining different states under which the direct current system is operated by the control apparatus of this invention, FIGS. 6 and 7 are characteristic diagrams for explaining the input-output relations of the phase shifter circuit under the characteristics of FIGS. 4 and 5, respectively, FIGS. 8 to 11 are characteristic diagrams for explaining influences to which the direct current system being operated by the control apparatus of this invention is subject on account of converter removing in direct current systems, and FIG. 12 is a block diagram showing another embodiment of this invention, FIGS. 13 and 14 are other characteristic diagrams corresponding to FIGS. 4 and 5 for explaining different status under which the direct current system is operated by the control apparatus of this invention, and FIGS. 15 and 16 are characteristic diagrams corresponding to that of FIGS. 8 and 10 in case of the converters being operated under characteristic diagrams shown in FIGS. 13 and 14.

FIG. 1 is a block diagram for conceptually explaining the position which the control apparatus of this invention occupies in a direct current system. In the figure, $U_1$, $U_2$, $U_3$ and $U_4$ denote converter stations, respectively. The converter stations $U_1$-$U_4$ are connected to respective alternating current systems $AC_1$, $AC_2$, $AC_3$ and $AC_4$, and they are connected in parallel by common direct current transmission lines $DC_p$ and $DC_n$. Hereunder, when it is unnecessary to specify any of the converter stations, the suffixes 1–4 will be omitted for the sake of simplicity. Each converter station U is provided with a transformer Tr, a converter CON, the control apparatus CA of this invention, and a current detector CT and a voltage detector PT for detecting a current through the converter CON and a terminal voltage of the converter CON, respectively. Needless to say, the transformer Tr couples the alternating current system AC and the converter CON, and the converter CON is connected to the direct current transmission lines $DC_p$ and $DC_n$. In order to generally control the converter stations U, a centralized control device CC is disposed. The control apparatus CA of each converter station U develops a control signal for the corresponding converter CON on the basis of current and voltage signals $I_d$ and $E_d$ respectively given as outputs of the current detector CT and the voltage detector PT, current and voltage reference signals $I_{dp}$ and $E_{dp}$ given from the centralized control device CC, and signals indicating the necessity for the bestowal of a current margin $\Delta I_d$ and a voltage margin $\Delta E_d$, and it delivers an ignition pulse to the converter CON at a control angle $\alpha$ responsive to the control signal. Each control apparatus CA includes two constant current control units ACR and a constant voltage control unit AVR as its constituents, and outputs of the units are selectively used.

FIG. 2 is a block diagram which shows an embodiment of the essential portions of the control apparatus of this invention. In the figure, numerals 10, 20, 50, 60, 70 and 130 designate adder circuits. Each of the adder circuits performs the addition of signals which are given in polarities indicated by the signs + and − in the figure. Numerals 40 and 80 represent selector switches. A movable piece 43 of the switch 40 is connected to either a terminal 41 or a terminal 42. A movable piece 83 of the switch 80 is connected to either a terminal 81 or a terminal 82 in the control apparatus of only one converter station, whereas at the neutral position it is connected to neither of the terminals in the control apparatuses of the other converter stations. Shown at 30, 90, 100 and 140 are operational amplifiers which have gains $-k_1$, $-k_2$, $+k_3$ and $-k_4$, respectively. Maximum value selector circuits 110 and 150 and a minimum value selector circuit 120 select the maximum value and the minimum value from among input signals applied thereto and provide them as outputs, respectively. In this case, the comparisons are made of magnitudes with the polarities taken into consideration. For example, when −10 V and 0 V are compared, 0 V is judged to be greater. The components denoted by the numerals 10–40 constitute the first constant current control unit $ACR_{n1}$ (Here, n is a suffix which generally designates the converter stations $U_1$–$U_4$. The same applies hereinafter), and the components denoted by the numeral 130–140 constitute the second constant current control unit $ACR_{n2}$, while the components indicated by the numerals 50–100 constitute the constant voltage control unit AVR. A signal produced by the first constant current control unit $ACR_{n1}$ and one signal produced by the constant voltage control unit AVR are introduced into the maximum value selector circuit 110, from which only the greater signal is provided as an output. A signal produced by the second constant current control unit $ACR_{n2}$ and another signal produced by the constant voltage control unit AVR are introduced into the maximum value selector circuit 150, from which only the great signal is provided as an output. The signal selected by the maximum value selector circuit 110 and the signal selected by the maximum value selecter circuit 150 are introduced into the minimum value selector circuit 120, from which only the smaller signal is provided as an output. The output signal $E_c$ of the minimum value selector circuit 120 is introduced into a pulse phase control circuit (not shown) to be described later, so that the ignition pulse of the phase corresponding to the signal $E_c$ is bestowed on the converter CON.

In the first constant current control unit $ACR_{n1}$, the current reference signal $I_{dpn1}$ to flow through the converter CON is fed to the adder circuit 10. The switch 40 has the movable piece 43 thrown on the side of the terminal 41 in the control apparatus of one or all of the converters which are operated as inverters. The movable piece 43 is thrown on the side of the terminal 42 in the control apparatus of any of the converters which are operated as rectifiers. When the movable piece 43 of the switch 40 is thrown to the terminal 41, the current margin $\Delta I_d$ is bestowed on the adder circuit 10. Accordingly, the current reference signal $I_{dpn1}$ of the converter is corrected to a corrected current reference signal $I_{dpn1}'$ which is decreased by $\Delta I_d$ (that is, $I_{dpn}' = I_{dpn} - \Delta I_d$), and which is applied to the adder circuit 20. When the movable piece 43 of the switch 40 is thrown to the terminal 42, $I_{dpn} = I_{dpn}'$. The actual current $I_{dn}$ detected by the current detector CT is introduced into the adder circuit 20. An output of the adder circuit 20 is introduced into the operational amplifier 30. That is, regarding one converter for operating as the inverter of the direct current system or all such converters, the constant current control unit $ACR_{n1}$ corrects the current reference signal $I_{dpn1}$ to the corrected current reference signal $I_{dpn1}'$ reduced by the current margin $\Delta I_d$ and develops the signal corresponding to the deviation from the real current $I_{dn}$. Regarding the converters on which no current margin is bestowed, whether they are the rectifiers or the inverters, $I_{dpn1} = I_{dpn1}'$, and the signal corresponding to the deviation between the current reference signal $I_{dpn1}$ and the actual current signal $I_{dn}$ is derived.

In the second constant current control unit $ACR_{n2}$, the current reference signal $I_{dpn2}$ to flow through the converter CON is fed to the adder 130. The actual current $I_{dn}$ detected by the current detector CT is introduced into the adder circuit 130. An output of the adder circuit 130 is introduced into the operational amplifier 140.

The current reference signal $I_{dpn1}$ in the $ACR_{n1}$ means the required current under the normal operation, while the current reference signal $I_{dpn2}$ in the $ACR_{n2}$ means the maximum allowable current when one converter operating as the inverter is removed from the direct current system.

In the constant voltage control unit AVR, the voltage reference signal $E_{dp}$ at the operation of the converter is fed to the adder circuit 50. The absolute value $|E_{dn}|$ of the real terminal voltage of the converter is applied to the adder circuit 50. The deviation signal between both the values, $E_{dp} - |E_{dn}|$ is provided from the adder circuit 50 as an output. The absolute value is herein employed in order to derive the terminal voltage of the converter as a voltage of the direct current system. The switch 80 has the movable piece 83 thrown onto the side of the terminal 81 or 82 when the converter of the converter station to which the particular switch belongs is to operate as the converter for determining the voltage of the direct current system. In any other converter, whether it is to operate as the rectifier or as the inverter, the movable piece 83 is placed at the neutral position. Here, when the rectifier is made the converter for determining the voltage, the movable piece 83 is thrown onto the terminal 81 side, whereas when the inverter is to determine the voltage, the movable piece 83 is thrown onto the terminal 82 side. Depending upon which of the terminals 81 and 82 the movable piece 83 of the switch 80 is thrown to, either of the adders 60 and 70 receives the voltage margin $\Delta E_d$ besides the aforementioned deviation signal $E_{dp} - |E_{dn}|$. An output of the adder circuit 60 is introduced into the operational amplifier 90; and an output of the adder circuit 70 into the operational amplifier 100. That is, the constant voltage control unit AVR effects the control so that, whether the converter is to operate as the rectifier or as the inverter, it may function as the converter for determining the voltage of the direct current system by the bestowal of the voltage margin.

Usually the control apparatus CA is additionally provided with a constant extinction angle control unit A$\gamma$R in order to prevent the inverter from causing commutation failure due to an insufficient extinction angle.

Also in this invention, the constant extinction angle control unit A$\gamma$R should be disposed in consideration of the voltage lowering of the alternating current system.

It will be explained later how the direct current system is operated as the result of the control under the control apparatus according to this invention. Prior to the explanation, an example of the characteristic of a phase shifter circuit as to the phase in which the ignition or gate pulse is to be bestowed on the converter relative to the output $E_c$ of the minimum value selector circuit 120 will now be described with reference to FIG. 3. In the figure, the axis of abscissas represents the magnitude of the control voltage $E_c$, while the axis of ordinates represents the retarded control angle $\alpha$ of the gate pulse to be applied to the converter. In the illustrated example, the angle $\alpha$ and the voltage $E_c$ are linearly proportional in the range in which the control voltage $E_c$ is not larger than a value $E_{co}$ and is not smaller than a value $E_{co}'$, and the angle $\alpha$ does not increase and decrease above 160° and 4° when the values $E_{co}$ and $E_{co}'$ are exceeded, that is, the angle $\alpha$ is saturated at 160° and 4°. The phase shifter circuit having such $E_c$-versus-$\alpha$ characteristic is very common, and it will be unnecessary to especially mention an example of a specific circuit arrangement thereof. As is well known, the converter is operated as rectifier in the range of $4° \leq \alpha < 90°$ and as the inverter in range of $90° < \alpha \leq 160°$. As a phase shifter circuit, any desired one can be adopted in dependence on the form in which the control voltage $E_c$ is derived. It is natural that the characteristic in FIG. 3 is not restrictive.

FIGS. 4 and 5 are characteristic diagrams for elucidating cases where the direct current system is operated in two different patterns under normal operation by the control apparatus of this invention. In both of the cases of FIGS. 4 and 5, stable runnings are conducted at points a, b, c and d. In either case, the converter stations U$_1$ and U$_2$ are operated as rectifier stations [REC] and the converter stations U$_3$ and U$_4$ as inverter stations [INV]. The cases differ in that, while the example in FIG. 4 determines the voltage of the direct current system by the converter station U$_1$, the example in FIG. 5 determines it by the converter station U$_3$. In the figures, $I_{dp11}$-$I_{dp41}$ and $I_{dp12}$-$I_{dp42}$ indicate the first and second current reference values of the respective converters, and $I_{d1}$-$I_{d4}$ the actually-flowing current values. $E_{dp}$ indicates the voltage reference value of each converter, and $E_{d1}$ or $E_{d3}$ the actual voltage value of the direct current system. $\Delta I_d$ and $\Delta E_d$ correspond to the current margin and the voltage margin explained with reference to FIG. 2, respectively.

Here, it is assumed for both the cases that the current margin is given by the switch 40 in the control apparatus of only U$_3$ of the converter stations U$_3$ and U$_4$ designated as the inverter stations.

Description will be made of the situation in which such characteristic is realized, including the operation of the control apparatus in FIG. 2. As the premise for the realization of the characteristic of this invention, it is indispensable that the voltage of the converter can be made a constant voltage by the phase control of the converter. For this requirement, it is necessary that a sufficient voltage is supplied to the converter by the transformer Tr. This condition is fulfilled, by way of example, as follows. The transformer Tr is provided with a well-known tap, the position of which is controlled by a tap control device, not shown, so that the no-load secondary voltage may become always constant irrespective of the current flowing through the converter.

The example of FIG. 4 is so constructed that the converter station U$_1$ determines the voltage of the direct current system. Accordingly, the constant voltage control unit AVR of the control apparatus CA has the movable piece 83 of the switch 80 thrown to the terminal 81 in only the control apparatus CA$_1$ of the converter station U$_1$, while the movable piece 83 is at the neutral position in the unit AVR of each of the other control apparatuses CA$_2$-CA$_4$. In other words, the voltage margin $\Delta E_d$ is bestowed only on the adder circuit 60 of the control apparatus CA$_1$. Since, as previously stated, the current margin $\Delta I_d$ is given in only the control apparatus CA$_3$ of the inverter station U$_3$, the current margin $\Delta I_d$ is bestowed only on the adder circuit 10 of the control apparatus CA$_3$.

In the control apparatuses of the respective converters, the first current reference values $I_{dpn1}$ are naturally made so that the sum between the current reference values of the rectifiers is equal to the sum between the current reference values of the inverters with the current margin left out of consideration. In the illustrated example, accordingly, $$I_{dp11} + I_{dp21} = I_{dp31} + I_{dp41}.$$

Since the current margin $\Delta I_d$ is applied to the adder circuit 10 in the control apparatus CA$_3$, the corrected current reference value $I_{dp31}'$ in the converter station U$_3$ becomes:

$$I_{dp31}' = I_{dp31} - \Delta I_d.$$

In the converters, all the voltage reference values are $E_{dp}$ and are therefore identical.

In connection with FIG. 4, it will be explained that the points a, b, c and d provide the stable running. It is now assumed for the sake of explanation that, likewise to a well-known 1-to-1 direct current system, the direct current system provided with the control apparatuses of this invention has a group of rectifier stations and a group of inverter stations started by a suitable method, and that the voltages and currents of the direct current system reach the points in FIG. 4. The retarded control angles α of the respective converters will be described together with the fact that the points are stable.

In the constant current control unit $ACR_{11}$ of the control apparatus $CA_1$, merely the current $I_{d1}$ which is smaller than the first current reference value $I_{dp11}$ by a current corresponding to the current margin $\Delta I_d$ flows, so that a positive signal of a magnitude corresponding to $\Delta I_d$ appears in the adder circuit 20. Consequently, the output of the operational amplifier 30 becomes negatively saturated. On the other hand, in the constant voltage control unit $AVR_1$, a signal of a magnitude corresponding to the voltage margin $\Delta E_d$ is delivered from the adder circuit 50. Since the adder circuit 60 has the voltage margin $\Delta E_d$ applied thereto through the switch 80, the output of the adder circuit 60 becomes a small error voltage $\epsilon_1$. As a result, the operational amplifier 90 receives an input in the linear region in which the input and output are proportional, and the output of the operational amplifier 90 becomes a value corresponding to the error voltage $\epsilon_1$. As a consequence, the output of the operational amplifier 90 is selected by the maximum value selector circuit 110 and is provided therefrom. Since the adder circuit 70 has no additive signal, it delivers therefrom a large positive signal corresponding to the voltage margin $\Delta E_d$ having appeared in the adder circuit 50. Therefore, the output of the operational amplifier 100 becomes positively saturated. In the constant current control unit $ACR_{12}$ of the control apparatus $CA_1$, the second current reference value $I_{dp12}$ is larger than the first current reference value $I_{dp11}$, so that a larger positive signal than the output of the adder circuit 20 appears in the adder circuit 130. Consequently, the output of the operational amplifier 140 becomes negatively saturated. The output of the operational amplifier 100, therefore, is selected by the maximum value selector circuit 150 and is provided therefrom. As the result, the minimum value selector circuit 120 selects the output of the operational amplifier 90 and delivers it as the output control signal $E_c$. In brief, in the control apparatus $CA_1$ of the rectifier for determining the voltage, as illustrated in FIG. 6, the output at the operational amplifier 90 of the constant voltage control unit $AVR_1$ is obtained as the control signal $E_{ca}$, and a gate signal of a retarded control angle $\alpha_a$ is impressed on the converter by the phase amplifier shifter circuit not shown. Accordingly, when a voltage fluctuation in the direct current system arises the control apparatus $CA_1$ absorbs it and controls the voltage of the direct current system so as to normally become $E_{d1}$, whereas the control apparatus $CA_1$ effects no control as to a fluctuation of the current $I_{d1}$.

At this time, the control apparatus $CA_2$ of the converter $CON_2$ which is also the rectifier functions as follows. In the constant current control unit $ACR_{21}$, a current $I_{d2}$ substantially equal to the first current reference value $I_{dp21}$ flows, and hence, the output of the adder circuit 20 becomes a small error voltage $\epsilon_2$. In consequence, the operational amplifier 30 receives an input in the linear region in which the input and output are proportional, and its output becomes a value corresponding to the error voltage $\epsilon_2$. On the other hand, in the constant voltage control unit $AVR_2$, the adder circuits 60 and 70 have no additive signal, and hence, the signal corresponding to the voltage margin $\Delta E_d$ as obtained at the adder circuit 50 is applied to the operational amplifiers 90 and 100 without any change, so that the operational amplifiers deliver signals negatively and positively saturated. In the constant current control unit $ACR_{22}$ of the control apparatus $CA_2$, since the second current reference value $I_{dp22}$ is larger than the $I_{dp21}$, the output of the operational amplifier 140 becomes negatively saturated in the $ACR_{22}$. The output of the operational amplifier 100, therefore is selected by the circuit 150. As the result, the output of the operational amplifier 30 is derived through the maximum value selector circuit 110 as well as the minimum value selector circuit 120. That is, the rectifier $CON_2$ is subjected to constant current control by the constant current control unit $ACR_{21}$. The control signal $E_{cb}$ and the retarded control angle $\alpha_b$ at this time are indicated in FIG. 6.

There will now be studied the control apparatuses $CA_3$ and $CA_4$ of the respective converters $CON_3$ and $CON_4$ which are the inverters. In the example of FIG. 4, in the control apparatus $CA_3$ of the inverter $CON_3$, the current margin $\Delta I_d$ is added to the adder circuit 10 through the switch 40. Therefore, the corrected current reference value $I_{dp31}'$ to be fed as the input of the adder circuit 20 diminishes by that component. In this case, however, the outputs of the respective adder circuits 20 become small error voltages $\epsilon_3$ and $\epsilon_4$ irrespective of the presence or absence of the current margin in the control apparatuses $CA_3$ and $CA_4$ of the inverters $CON_3$ and $CON_4$. On the other hand, the constant voltage control units AVR of the respective control apparatuses $CA_3$ and $CA_4$ are similar to the constant voltage control unit $AVR_2$ of the control apparatus $CA_2$, and the operational amplifiers 90 and 100 provide the outputs saturated negatively and positively, respectively. In the constant current control units $ACR_{32}$ and $ACR_{42}$ of the control apparatus $CA_3$ and $CA_4$, the second current reference values $I_{dp32}$ and $I_{dp42}$ are larger than the first current reference values $I_{dp31}$ and $I_{dp41}$, so that the larger positive signals than the outputs of the adder circuit 20 appears in the adder circuit 130. The outputs of the operational amplifiers 140, therefore, becomes negatively saturated and the outputs of the operational amplifiers 100 are selected by the maximum value selector circuits 150. It is eventually the outputs of the constant current control units $ACR_{31}$ and $ACR_{41}$ that are obtained through the maximum value selector circuits 110 and the minimum value selector circuits 120. Gate pulses are impressed on the converters $CON_3$ and $CON_4$ at retarded control angles based on control signals corresponding to the error voltages $\epsilon_3$ and $\epsilon_4$, respectively. The control signals $E_{cc}$ and $E_{cd}$ and the retarded control angles $\alpha_c$ and $\alpha_d$ at this time are indicated in FIG. 6.

In the gross study of the characteristic in FIG. 4, it is understood that the converter $CON_1$ controls the voltage of the direct current system to the value $E_{d1}$ by means of the constant voltage control unit $AVR_1$, while the other converters are subjected to the constant current controls by means of the respective constant current control units $ACR_{21}$–$ACR_{41}$. The respective constant current control units $ACR_{12}$–$ACR_{42}$ do not take part in control operation under normal operation of the direct current transmission system. Needless to say, the specific magnitudes of the currents become as follows:

$$I_{dp11} + I_{dp21} = I_{dp31} + I_{dp41}$$

$$I_{d1} + I_{d2} = I_{d3} + I_{d4}$$

$$(I_{dp11} + I_{dp21}) - (I_{dp31}' + I_{dp41}) = \Delta I_d.$$

It will also be easily confirmed from the following explanation that the operating points a, b, c and d in FIG. 4 are stable points. It is assumed by way of example that the voltage of the direct current system has lowered very slightly due to any cause. On account of the lowering, the output of the adder circuit 60 increases slightly in the constant voltage control unit AVR$_1$ of the control apparatus CA$_1$. As the result, the output of the operational amplifier 90 decreases correspondingly. This means a decrease of the control voltage E$_c$, so that the retarded control angle decreases and the voltage of the direct current system is recovered. Regarding the constant voltage control units AVR$_2$-AVR$_4$ of the other converters, the saturation states of the operational amplifiers 90 and 100 are hardly affected by the slight voltage lowering. Accordingly, these converters are controlled by the constant current control units ACR$_{21}$-ACR$_{41}$ as previously stated. Since the operational amplifier 30 of the constant current control unit ACR$_{11}$ of the converter CON$_1$ is held saturated, the voltage lowering exerts no influence on the control unit ACR$_{11}$. The same applies to a change of the current. It is assumed by way of example that the current flowing through the converter CON$_2$ has increased or decreased very slightly due to any cause. This signifies that very slight current fluctuations in the form of an increase or decrease have also arisen in the other converters. As the result, the outputs of the adder circuits 20 of the constant current control units ACR$_{21}$-ACR$_{41}$ of the converters CON$_2$-CON$_4$ fluctuate very slightly by those components and change the control voltages E$_c$. Eventually, the voltages and currents are stably settled to the points a, b, c and d in FIG. 4.

Description will now be made of a case where, when the direct current transmission system is being stably operated in the characteristic of FIG. 4, the converter station for determining the voltage of the direct current system is altered to the inverter station U$_3$.

For the alteration, the movable piece 83 of the switch 80 of the constant voltage control unit AVR$_3$ of the control apparatus CA$_3$ is connected from the neutral position to the terminal 82. It is also necessary to shift to the neutral position the movable piece 83 of the switch 80 of the constant voltage control system AVR$_1$ in the control apparatus CA$_1$. No other manipulation is required.

In the control apparatus CA$_3$, consequently, the voltage margin $\Delta E_d$ is added to the adder circuit 70. As a result, the output of the adder circuit 70 becomes a small error voltage $\epsilon_3$, as apparent from the explanation of the characteristic of FIG. 4. Accordingly, the operational amplifier 100 receives an input in the linear region in which the input and output are proportional, and its output becomes a value corresponding to the error voltage $\epsilon_3'$.

In the control apparatus CA$_1$, the voltage margin $\Delta E_d$ having been applied to the adder circuit 60 is removed, so that the output of the adder circuit 60 becomes a large positive one. The output of the operational amplifier 90 is, therefore, saturated negatively. Before returning the movable piece 83 of the switch 80 to the neutral position, the operational amplifier 30 had been negatively saturated and the operational amplifier 100 had been positively saturated. Therefore, when the output of the operational amplifier 90 is also saturated negatively, the negative saturation value of the operational amplifier 30 or 90 is provided as an output from the maximum value selector circuit 110 and it passes through the minimum value selector circuit 120. As a result, the control signal E$_c$ which renders the retarded control angle $\alpha$ zero is produced from the control apparatus CA$_1$ of the converter CON$_1$. The current I$_{d1}$ of the converter CON$_1$ therefore increases. This increase continues until the current I$_{d1}$ becomes a value I$_{d1}'$ which is substantially equal to the current reference value I$_{dp1}$. When the error voltage of the adder circuit 20 of the control apparatus CA$_1$ becomes a small value $\epsilon_1'$ and the output of the operational amplifier 30 becomes a value corresponding to the error voltage $\epsilon_1'$, the current increase comes to a stop.

In this case, the saturated status of the operational amplifier 140 does not change since the reference value I$_{dp32}$ is larger than the direct current I$_{d1}$ flowing through the converter CON$_1$. The output of the amplifier 140, therefore, is saturated negatively.

The converter CON$_1$ merely has the voltage margin $\Delta E_{hd}$ d removed therefrom, and the control by the constant voltage control unit AVR$_1$ is shifted to the control by the constant current control unit ACR$_{11}$.

As a result of the change of the converter CON$_1$ to the constant current control, the current through the converter CON$_1$ increases by approximately the current margin $\Delta I_d$. Since, however, the control apparatuses CA$_2$ and CA$_4$ of the respective converters CON$_2$ and CON$_4$ are subject to no manipulation, they still effect the constant current control function. Therefore, the current increased by the converter CON$_1$ exerts eventually no influence on the converters CON$_2$ and CON$_4$ even though it tries to affect them, and it cannot help flowing into the converter CON$_3$.

As previously seen, when the characteristic of FIG. 4 has been satisfied, the small error voltage $\epsilon_3$ has appeared at the adder circuit 20 in the control apparatus CA$_3$ of the converter CON$_3$. On the other hand, when by the manipulations of the switches 80, the voltage margin $\Delta E_d$ of the control apparatus CA$_1$ of the converter CON$_1$ is removed and the voltage margin $\Delta E_d$ is bestowed on the control apparatus CA$_3$ of the converter CON$_3$, a small error voltage $\epsilon_3$, appears at the adder circuit 70 in the control apparatus CA$_3$. Simultaneously therewith, independently of the correcting current reference value I$_{dp31}'$, a current I$_{d3}'$ larger than the current I$_{dp31}'$ flows from the converter CON$_1$. In the control apparatus CA$_3$, accordingly, a large negative error voltage appears at the adder circuit 20, with the result that the output of the operational amplifier 30 is positively saturated. After all, the output of the operational amplifier 100 is selected by the maximum value selector circuit 150 and the minimum value selector circuit 120. That is, merely by the addition of the voltage margin $\Delta E_d$, the converter CON$_3$ is changed from the control by the constant current control unit ACR$_{31}$ to the control by the constant voltage control unit AVR$_3$.

The characteristic at this time is illustrated in FIG. 5. The relation between the control voltage E$_c$ and the retarded control angle $\alpha$ of each control apparatus is illustrated in FIG. 7, the quantities being dashed. Also in FIG. 5, the stable running points are indicated at a, b, c and d. It is understood that the converters CON$_1$, CON$_2$ and CON$_4$ are subject to the constant current control, while the converter CON$_3$ is subject to the constant voltage control.

Also at this time, the following relations are of course fulfilled:

$$I_{dp11} + I_{dp21} = I_{dp31} + I_{dp41}$$

$$I_{d1}+I_{d2}=I_{d3}+I_{d4}$$

$$(I_{dp11}+I_{dp21})-(I_{dp31}'+I_{dp41})=\Delta I_d.$$

In this case, the respective constant current control units $ACR_{12}$-$ACR_{42}$ do not take part in control operation of the direct current transmission system.

It will now be simply referred to that the operation under the stable state of FIG. 5 is shifted to the state of FIG. 4 again. Naturally, the voltage margin $\Delta E_d$ is removed from the control apparatus $CA_3$ and is added to the control apparatus $CA_1$. As the result, the output of the operational amplifier 60 in the control apparatus $CA_1$ becomes a small error voltage, and the situation becomes capable of the voltage control. Simultaneously, in the control apparatus $CA_3$, the output of the adder circuit 70 becomes a positive large value, the output of the operational amplifier 100 is positively saturated, and the control voltage $E_c$ becomes a positive large value, so that the current becomes difficult to flow through the converter $CON_3$. Thus, the operation is shifted to the characteristic of FIG. 4 and the stable running is enabled.

As briefly stated in the foregoing, where the lowering of the voltage of the alternating current system comes into question, the constant extinction angle control unit $A\alpha R$ is naturally provided additionally. As the constant extinction angle control unit $A\alpha R$, any desired one can be adopted. In the case of the example of FIG. 2, the unit $A\alpha R$ shall provide a voltage as an output on the basis of the current $I_{dn}$ flowing through the inverter $CON_n$ and an a.c. voltage $E_{an}$ applied to the inverter $CON_n$, the output voltage corresponding to the maximum retarded control angle $\alpha_{max}$ at which the inverter does not undergo the commutation failure under the current and the voltage. The output of the constant extinction angle control unit $A\alpha R$ is fed to the minimum value selector circuit 120. Accordingly, if on account of, e.g., the voltage fall of the alternating current system, the constant current control unit ACR or the constant voltage control unit AVR provides an output voltage greater than the output of the constant extinction angle control unit $A\alpha R$ and intends to deliver an ignition pulse at a larger retarded control angle in order to maintain the current or voltage of the converter, then the output of the constant extinction angle control unit $A\alpha R$ will be selected and the control which prefers the stable running of the inverter rather than the maintenance of the current or voltage will be established.

In the above, description has been made only of the steady state. It will now be explained that the stable running is not specifically spoilt even by influences at the time of a removing of the converter operating as the inverter from the direct current system.

The characteristic curves of the two examples i.e. FIGS. 8 and 10 show influences to which the direct current system having been stably operated under the state of FIG. 4 is subject on account of the case in which the converters $CON_3$ and $CON_4$ operating as the inverters are removed from the direct current system due to any cause. In the respective case of FIGS. 8 and 10, the stable running is eventually attained at points a, b, and d and b and d. Further the examples involve differences in the current distribution and the voltage of the direct current system.

In the example of FIG. 8, since the converter $CON_3$ operating as inverter is removed, the direct currents $I_{d1}$ and $I_{d2}$ which had been converters $CON_1$ and $CON_2$ operating as a rectifier under normal operation are going to flow into the converter $CON_4$ through the transmission line. Since the converters $CON_2$ and $CON_4$, however, are controlled by the constant current control units $ACR_{21}$ and $ACR_{41}$, the currents $I_{d2}$ and $I_{d4}$ do not change and the current $I_{d1}$ is reduced. When the currents become $I_{d1}+I_{d2}=I_{d4}$, the operation of the direct current system becomes stable under running points a, b and d. In this case, if the current $I_{d4}$ is smaller than $I_{d2}$, the converter $CON_1$ does not supply the d.c. system with the direct current. The operating status, therefore, becomes different from FIG. 8. The status is explained in FIG. 10, because the status of both is similar.

In the example of FIG. 10, since the converter $CON_4$ operating as an inverter is removed, the direct currents $I_{d1}$ and $I_{d2}$ which had been supplied by the converters $CON_1$ and $CON_2$ operating as rectifiers are going to flow into the converter $CON_3$ through the transmission line. Since the corrected direct current reference $I_{dp31}'$ of the converter $CON_3$, however, is smaller than the current $I_{d2}$ supplied by the converter $CON_2$, the converter $CON_1$ cannot generate direct current and is removed from the direct current system. Therefore, the converter $CON_3$ becomes a direct voltage control converter and the converter $CON_2$ is operated under a minimum retarded control angle. In this case, the characteristic curve of the converter $CON_2$ is shown by the dotted line having a regulation which is determined by the construction of the converter station. When the current $I_{d2}$ becomes equal to the current $I_{d3}$, the operation of the direct current system becomes stable under running points b and d.

The characteristic curves of the two examples i.e. FIGS. 9 and 11 show the influences to which the direct current system having been stably operated under the state of FIG. 5 is subject on account of the case in which the converters $CON_3$ and $CON_4$ operating as inverters are removed from the direct current system due to any cause. In the respective cases of FIGS. 9 and 11, the stable running is eventually attained at points a, b and d and a, b, and c. Further the examples involve differences in the current distribution and the voltage of the direct current system.

In the example of FIG. 9, since the converter $CON_3$ operating as inverter and controlling the line voltage of the direct current system is removed, the direct currents $I_{d1}$ and $I_{d2}$ which had been supplied by the converters $CON_1$ and $CON_2$ operating as rectifiers under normal operation are going to flow into the converter $CON_4$. When the current $I_{d4}$ increase to the second current reference $I_{dp42}$, the constant current control unit $ACR_{42}$ of the converter $CON_4$ operates and limits the current to prevent increase over the second current reference $I_{dp42}$. Therefore, the converters $CON_1$ and $CON_2$ are operated on the regulation curves which are shown by dotted line and are determined by the construction of the converter station. When the sum of the currents $I_{d1}+I_{d2}$ becomes equal to the current reference $I_{dp42}$, the operation of the direct current system becomes stable under the running points a, b and d.

In the example of FIG. 11, the status is similar to that of FIG. 9 except that the converter $CON_4$ is removed instead of the converter $CON_3$.

In both examples, as stated above, the converter operating as an inverter is operated under allowable maximum current so as to not reach an over current condition.

FIG. 12 is a block diagram which shows another embodiment of the essential portions of the control apparatus of this invention. In the figure, the same or equivalent parts as in the embodiment of FIG. 2 have the same symbol assigned thereto. In the previous embodiment of FIG. 2, all the control apparatuses of the converters are provided with means for bestowing the current margin and the voltage margin, and the margins are bestowed on only the necessary control apparatuses CA by the switches 40 and 80 in response to the command from the centralized control device CC. In contrast, the control apparatus of FIG. 12 is convenient for the current margin and the voltage margin to be commanded from the centralized control device CC in forms already considered. For this reason, when the apparatus of FIG. 12 is compared with that of FIG. 2, the former differs from the latter in that the gain of the operational amplifier 90 is altered from $-k_2$ to $+k_2$, that a polarity changer 200 is required and that the terminal voltage $E_{dn}$ of the converter need not be derived in the absolute value. In the other points, both apparatuses are substantially the same. In the embodiment of FIG. 12, the reference values of the current and the voltage are given as follows. In the constant current control system $ACR_{n1}$, the current setpoint with the current margin considered is bestowed on the control apparatus of one or all of the converters which are operated as inverters. That is, the corrected current reference value $I_{dpn1}'$ indicated in FIG. 2 is bestowed. In the constant voltage control system AVR, the voltage reference value $E_{dp}-\Delta E_d$ with the voltage margin considered is bestowed only on the control apparatus of one converter which is operated as the converter for determining the voltage of the direct current system. Regarding all the remaining converters, the value $E_{dp}$ is given as the voltage reference value. The adder circuit 60 is given the voltage reference value directly, while the adder circuit 70 is given the same through the polarity changer 200. The voltage $E_{dn}$ of the direct current system is directly introduced into the adder circuits 60 and 70. The polarities of the signals in the adder circuits are + and − as indicated in the figure.

It will be briefly explained as to the state of FIG. 4 that the direct current system can also be stably operated by the embodiment of FIG. 12. First, the converter $CON_4$ will be discussed. In the constant current control unit $ACR_{11}$, a large error voltage appears at the adder circuit 20, and the operational amplifier 30 is negatively saturated. The error voltage of the adder circuit 60 of the constant voltage control unit $AVR_1$ is small, and the operational amplifier 90 provides an output in the linear region. Since the adder circuit 70 produces an output of very large positive error voltage, the operational amplifier 100 is positively saturated. As the result, a output of the operational amplifier 90 is selected as the control voltage $E_c$. In the constant current control unit $ACR_{12}$, of course, a large error voltage appears at the adder circuit 130, and the operational amplifier 140 is negatively saturated. That is, the converter $CON_1$ is subject to the constant voltage control. In any of the other three converters $CON_2$-$CON_4$, the error voltage of the adder circuit 20 of the corresponding one of the constant current control units $ACR_{21}$-$ACR_{41}$ becomes small, and the operational amplifier 30 provides an output in the linear region. On the other hand, in any of the constant voltage control units $AVR_2$-$AVR_4$, the adder circuit 60 provides an output of large negative error voltage, and the adder circuit 70 an output of large negative error voltage. Therefore, the operational amplifiers 90 and 100 are saturated negatively and positively, respectively. In any of the other three constant current control units $ACR_{22}$-$ACR_{42}$ of the converters $CON_2$-$CON_4$, of course, the error voltage of the adder circuit 130 is large, and the operational amplifier 140 is negatively saturated. Consequently, the converters $CON_2$-$CON_4$ are subject to the constant current control.

It will be briefly explained that the embodiment of FIG. 12 can also realize the stable running under the state of FIG. 5.

It will be examined if the running state of FIG. 5 is stable by the use of the embodiment of FIG. 12. The converter $CON_3$ which is the inverter and which determines the voltage of the direct current system has the voltage reference value $E_{dp}-\Delta E_d$ with the current margin considered. As stated above, the converter terminal voltage $E_{d3}$ is given in the negative sign. Accordingly, the error voltage of the adder circuit 70 of the control apparatus $CA_3$ of the converter $CON_3$ becomes small, and the output of the operational amplifier 100 becomes the linear region. Both the adder circuits 20, 60 and 130 produce large error voltages, and the operational amplifiers 30, 90 and 140 are saturated positively and negatively, respectively. As the result, the output of the operational amplifier 100 is selected as the output of the control voltage $E_c$. Thus, the inverter $CON_3$ is subject to the constant voltage control. It is as explained of the state of FIG. 4 that the other converters are subject to the constant current control.

It will be self-explanatory that, similar to the embodiment of FIG. 2, the embodiment of FIG. 12 can effect stable control against the removal of the converter operating as the inverter in the direct current systems as illustrated in FIGS. 8-11.

The exemption of one converter from the direct current system under operation may be made as follows. In order to exempt, for example, the converter $CON_1$ determining the voltage of the direct current system during the operation in the state of FIG. 4, the voltage margin $\Delta E_d$ is shifted to any of the other converters $CON_2$-$CON_4$. By way of example, the state of FIG. 5 is established. Thereafter, the current reference values of the respective converters are reduced without destroying the condition that the difference between the sum $(I_{dp11}+I_{dp21})$ of the current reference values of the rectifiers and the sum $(I_{dp31}'+I_{dp41})$ of the corrected current reference values of the inverters is equal to the current margin $\Delta I_d$. When $I_{dp11}=0$ is reached, the converter $CON_1$ may be exempted. Needless to say, in order to exempt the converter under the constant current control $ACR_{n1}$, the current reference value may be reduced gradually from the beginning with only the foregoing relation of the current reference values $I_{dpn1}$ borne in mind.

In order to add the converter under stop to the direct current system, the following steps may be taken. The converter is connected to the direct current system. The voltage is set at the value $E_{dp}$. The current reference value is increased gradually as the foregoing relation of the current reference values is satisfied.

In case of the exemption or addition of the converters from and to the direct current system as the normal operation, the constant current control units $ACR_{n2}$ do not take part in control operation of the direct control transmission system.

FIGS. 13 and 14 show the characteristic diagrams for explaining different states under which the direct current system is operated by the control apparatus of this invention. These diagrams are similar and corresponding to that of FIGS. 4 and 5 except that the each voltage margine value $\Delta E_d$ of the control apparatus CA is different each other.

FIGS. 15 and 16 are characteristic diagrams corresponding to that of FIGS. 8 and 10 in case of the converters being operated under characteristic diagrams shown in FIGS. 13 and 14.

Where the voltage margines $\Delta E_{dn}$ of the constant voltage control units $AVR_n$ are different each other, the line voltage is determined by the converter which has the largest voltage margin.

The description of the operation of the converters about FIGS. 13-16 is omitted because of similar operation of FIGS. 4, 5, 8 and 10.

As understood from the above description, in the control apparatus of this invention, the signals responsive to the differences between the current reference values and the actual converter current are produced by the constant current control units $ACR_{n1}$ and $ACR_{n2}$, while the two different signals of the positive and negative directions are produced by the constant voltage control unit on the basis of the voltage reference value with the voltage margin considered and the terminal voltage of the converter. From among the four signals, the most suitable signal is selected by the maximum value selector circuits 110 and 150 as well as the minimum value selector circuit 120. Thus, the converters are controlled so that the direct current system may stably operate in any situation.

In accordance with this invention, therefore, insofar as the following two conditions are fulfilled:

(1) the sum of the current reference values of the converters which are operated as the rectifiers is greater by the component of the current margin than the sum of the corrected current reference values of the converters which are operated as the inverters, and (2) the constant current control unit, at least, for the converter used as the inverter has to have the second current reference which is equal to (or smaller than) the allowable maximum current of the converter.

(3) the voltage reference value of the converter which is designated as the converter for determining the system voltage is, essentially, smaller by the voltage margin than the voltage reference value of any other converter, it can be realized without posing any problem to operate any desired converter as the rectifier or the inverter and to stop the converter running in the direct current system or add the stopped converter to the direct current system so as to participate in the running.

What we claim is:

1. In a parallel connected multi-terminal direct current system wherein at least three converters are connected in parallel to direct current transmission lines for operation as inverters or rectifiers, each converter having a converter control apparatus comprising:

first constant current control means for providing a first signal for controlling the current of the converter on the basis of the deviation between a first current reference signal of said converter and the actual current thereof;

second constant current control means for providing a second signal for controlling the current of the converter on the basis of the deviation between a second current reference signal of said converter and the actual current thereof;

first and second constant voltage control means for providing third and fourth signals, respectively, for controlling the voltage of the converter on the basis of the deviation between a voltage reference signal of said converter and the actual voltage thereof;

first selector means for selecting the larger one between said first signal of said first constant current control means and the third signal of said first constant voltage control means;

second selector means for selecting the larger one between said second signal of said second constant current control means and the fourth signal of said second constant voltage control means; and third selector means for selecting the smaller one between the signals selected by said first and second selector means.

2. The converter control apparatus according to claim 1, further comprising constant extinction angle control means for providing a signal for keeping at a predetermined value an extinction angle of said converter as determined by a d.c. current flowing through said converter and a voltage of an alternating current system applied to said converter, an output of said constant extinction angle control channel being introduced into said third selector means.

3. In a parallel connected multi-terminal direct current system wherein at least three converters are connected in parallel to direct current transmission lines, each converter having a converter control apparatus comprising:

first constant current control unit including a first adder circuit which receives a first current reference value of the associated converter as an input, a second adder circuit which receives an output of said first adder circuit and an actual current value of said converter as inputs and which provides a difference between said inputs as an output, and a first operational amplifier which amplifies said output of said second adder circuit at a predetermined gain;

second constant current control unit including a third adder circuit which receives a second current reference value of the associated converter and an actual current value of said converter as inputs and which provides a difference between said inputs as an output, and a second operational amplifier which amplifies said output of said third adder circuit at a predetermined gain;

a constant voltage control unit including a fourth adder circuit which receives a voltage reference value of the associated converter and an actual voltage value thereof as inputs and which provides the difference between said inputs as an output, a fifth adder circuit which receives said output of said fourth adder circuit as an input, a third operational amplifier which amplifies an output of said fifth adder circuit at a predetermined gain, a sixth adder circuit which receives said output of said fourth adder circuit as an input, and a fourth operational amplifier which amplifies an output of said sixth adder circuit at a predetermined gain;

first selector means to select either of the outputs of said first and third operational amplifiers;

second selector means to select either of the outputs of said second operational amplifier and said fourth operational amplifier;

third selector means to select either of the outputs of said first and second selector means;

means for applying a signal to essentially lower the current reference value to said first adder circuit in the control apparatus of at least one of those converters among all the converters constituting said direct current system which are operated as inverters; and means for applying a signal to essentially lower the voltage reference value either to said fifth adder circuit or said sixth adder circuit in the control unit of a voltage determining converter among all of the converters constituting said direct current system, so that when the voltage determining converter operates as a rectifier, the signal is applied to said fifth adder circuit, and when the voltage determining converter operates as an inverter, the signal is applied to said sixth adder circuit.

4. The converter control apparatus according to claim 3, wherein said means for applying said signal to said fifth or sixth adder circuit includes a selector switch.

5. The converter control apparatus according to claim 3, further comprising constant extinction angle control means for providing a signal for keeping at a predetermined value an extinction angle of said converter as determined by a d.c. current flowing through said converter and a voltage of an alternating current system applied to said converter, and means for applying an output of said constant extinction angle control device to said third selector means.

6. The converter control apparatus according to claim 4, further comprising constant extinction angle control means for providing a signal for keeping at a predetermined value an extinction angle of said converter as determined by a d.c. current flowing through said converter and a voltage of an alternating current system applied to said converter, and means for applying an output of said constant extinction angle control device to said third selector means.

7. A converter control apparatus for a parallel connected multi-terminal direct current system wherein at least three converters are connected in parallel to direct current transmission lines, comprising:

first constant current control unit including first adder circuit which receives first current reference value of the converter and an actual current value thereof as inputs and which provides a difference between said inputs as an output, and a first operational amplifier which amplifies said output of said first adder circuit at a predetermined gain, second constant current control unit, which is provided to the converter being operated as the inverter, including second adder circuit which receives second current reference value of the converter and an actual current value thereof as inputs and which provides a difference between said inputs as an output, and second operational amplifier which amplifies said output of said second adder circuit at a predetermined gain, a constant voltage control unit including a third adder circuit which receives a voltage reference value of said converter and an actual voltage value thereof as inputs and which provides a difference between said inputs as an output, a third operational amplifier which amplifies said output of said third adder circuit at a predetermined gain, a fourth adder circuit which receives as inputs a signal with said voltage reference value of said converter changed in sign and said actual voltage value of said converter and which provides a difference between said inputs as an output, and a fourth operational amplifier which amplifies said output of said fourth adder circuit at a predetermined gain, first selector means to select either of the outputs of said first and third operational amplifiers, and second selector means to select either of the outputs of said second amplifier and said fourth operational amplifier, third selector means to select either of the outputs of said first and second selectors, the first current reference values of said converters being so set that a sum of said current reference values of all rectifiers of said converters constituting said direct current system may become larger by a predetermined value than a sum of said current reference values of all inverters, the second current reference values being set to be larger than the said first current reference, one of all the converters of said direct current system having its voltage reference value set to be smaller than the voltage reference values of the other converters.

8. The converter control apparatus according to claim 7, further comprising a constant extinction angle control device which forms a signal for keeping at a predetermined value an extinction angle of said converter as determined by a d.c. current flowing through said converter and a voltage of an alternating current system applied to said converter, an output of said constant extinction angle control device being introduced into said third selector means.

9. The converter control apparatus according to claim 1, wherein at least one of said first and second constant voltage control means of at least one of said converter control apparatus includes means for providing as an output a positive or negative excess signal relative to the actual voltage of the associated converter under a steady running state.

10. The converter control apparatus according to claim 9, further including means for setting said first current reference signal among the control apparatuses of all the converters constituting said direct current system so that the sum of the current reference values of the converters operated as rectifiers may become larger by a predetermined value than the sum of the corrected current reference values of the converters operated as inverters.

11. The converter control apparatus according to claim 10, wherein said setting means includes means for setting said second current reference signal to a larger value than said first current reference signal.

12. The converter control apparatus according to claim 11, further including means for applying to said one of said converter control apparatuses a voltage reference value which is smaller by a predetermined value than the voltage reference values of said other converter control apparatuses.

* * * * *